United States Patent [19]

Wedam

[11] Patent Number: 5,606,423
[45] Date of Patent: Feb. 25, 1997

[54] COMPATIBLE HIGH-RESOLUTION VIDEO RECORDING FORMAT

[75] Inventor: Werner F. Wedam, Lawrenceville, N.J.

[73] Assignee: SamSung Electronics Co., Ltd., Suwon, Rep. of Korea

[21] Appl. No.: 599,566

[22] Filed: Oct. 18, 1990

[51] Int. Cl.$^6$ .................................................. H04N 9/79
[52] U.S. Cl. .................................................... 386/27
[58] Field of Search ..................... 358/310, 330, 358/335, 12, 14, 16, 18, 23; 360/33.1

[56] References Cited

U.S. PATENT DOCUMENTS

| 4,520,385 | 5/1985 | Jackson et al. | 358/330 |
| 4,743,978 | 5/1988 | Tanaka | 358/343 |
| 4,812,920 | 3/1989 | Nagashima et al. | 358/330 |
| 4,984,093 | 1/1991 | Schmidtmann et al. | 358/330 |

FOREIGN PATENT DOCUMENTS

| 0070154 | 1/1983 | European Pat. Off. . |
| 62-257292A | 11/1987 | Japan . |
| 63-13490A | 1/1988 | Japan . |

*Primary Examiner*—Thai Q. Tran
*Attorney, Agent, or Firm*—Robert E. Bushnell, Esq.

[57] ABSTRACT

A new VCR recording format, the augmented or "A-" format, such as A-VHS, is described which is fully compatible with the existing standard recording formats, such as VHS. In the new format, the high-frequencies of the luminance component of the television video signal, which are needed for maintaining sharp pictures but which are missing in standard (VHS) recording systems, are recorded on the video tape in an additional luminance channel, or so-called augmentation channel, which utilizes a portion of the recording spectrum which is above the bandwidth occupied by the luminance component in the standard (VHS) system. A new AM-modulated augmentation signal carrier is used to locate and carry the additional luminance spectrum above the standard VHS luminance FM-spectrum. In the preferred embodiment, the luminance high-frequencies are compressed in bandwidth in order to make efficient use of the bandwidth available in the augmentation channel. The bandwidth compression can be provided by the use of one or more known techniques, such as quadrature modulation of the carrier or multi-dimensional pre-processing of the luminance high-frequencies. The bandwidth for this augmentation channel can be obtained by making A-VHS recordings on higher quality tape material, such as that used for the S-VHS format, and by utilizing better recording/playback heads with smaller gaps and higher coercivity, such as also used in the S-VHS system.

17 Claims, 4 Drawing Sheets

COMPATIBLE HIGH-RESOLUTION VIDEO RECORDING FORMAT

FIELD OF THE INVENTION

The present invention relates generally to video cassette recording of television video signals, and more particularly, to the use of an additional recording band or augmentation channel for recording high-frequency luminance signals so as to thereby provide a picture performance for video cassette recorders (VCR's) which is improved as compared to that of the existing formats and which is also fully compatible therewith.

BACKGROUND OF THE INVENTION

When low-cost consumer type VCR systems, such as the current popular VHS system, were invented, the major objective was to provide recording capability for the purpose of time-shifting television programming. Unfortunately, the performance of the now popular VCR formats was compromised in order to counteract the introduction of Video Disc systems which had the potential during VCR infancy to decrease the market share for VCR's. As a result, video recorders suffered from low picture quality (e.g., only 2.5 MHz bandwidth was provided for the luminance component as compared with the NTSC (National Television Systems Committee) bandwidth of 4.2 MHz. But VCR's won in popularity over the Video Disk. Furthermore, because no careful evaluation took place, these early recording formats were not designed with the vision in mind to later develop compatible upgrades to the full NTSC signal spectrum.

Later development efforts resulted in several improved recording formats, such as the Super VHS (S-VHS) system which addressed this lack of quality, but the new formats with better performance were incompatible with the existing, standard, equipment (e.g., home VCR's as well as tape duplication machines for the rental market). This lack of compatibility has prevented these systems from gaining widespread acceptance, particularly due to the large number of existing VCR machines in the marketplace, as well as the great quantity of existing pre-recorded tapes in the old formats (both rental and privately owned). For example, the S-VHS system achieved an upward scaling of performance by use of improved bandwidth handling capabilities of the tape and the recording/playback heads. This, together with a shift to higher recording frequencies, allowed S-VHS quality to exceed the standard NTSC performance but rendered the format unsuitable for playback by standard VHS players, thus preventing the S-VHS system from gaining widespread acceptance and use.

It is an object of the present invention to provide a recording format which provides full compatibility with the existing formats and which yields picture performance equivalent to that of full NTSC by augmenting the standard recording formats.

It is a further object of the invention that video tapes recorded by this new augmented format can be played by (i.e., are backward compatible with) the standard VCR's and that tapes recorded in the standard formats can be played back in a VCR designed in accordance with this new tape recording format.

SUMMARY OF THE INVENTION

In accordance with the principles of the invention, a new VCR recording format, the augmented or "A-" format, is provided which is fully compatible with it's existing related (e.g., VHS, Beta, etc.) standard system. In the new format, the high-frequencies of the luminance component of the television video signal, which are needed for maintaining sharp pictures but which are missing in the standard recording systems, are recorded on the video tape in an additional luminance channel, or so-called augmentation channel, which utilizes a portion of the recording spectrum which is above the bandwidth occupied by the luminance component in the standard system. A new augmentation signal carrier is used to locate and carry the high-frequency luminance information above the standard (low-frequency) luminance spectrum. The bandwidth for this augmentation channel can be obtained by making "A-" format recordings on higher quality tape material, and by utilizing better recording/ playback heads with smaller gaps and higher coercivity, similar to what is done in the improved format recording systems.

In the preferred embodiment (which uses the VHS system as an example), the luminance high-frequencies are compressed in bandwidth in order to make efficient use of the bandwidth available in the augmentation channel. The bandwidth compression can be provided by the use of one or more known analog or digital techniques, such as quadrature modulation or multi-dimensional (temporal, horizontal or vertical) pre-processing of the luminance high-frequencies. The playback system is designed similar to that of the present S-VHS players which provide for playback of either VHS or S-VHS tapes by selecting the appropriate demodulation circuitry. For the playback of A-VHS tapes, the augmentation signal is first separated from the playback spectrum, and then demodulated and placed back to its original spectral position in the recovered video signal. Standard tapes are recovered without any changes necessary in the playback circuitry of the augmented VCR, except perhaps a simple muting of the output of the augmentation channel when a VHS tape is detected as being played-back. S-VHS tapes can also be played back by automatic selection of S-VHS circuitry which is also provided in the player.

In addition to the compatibility advantages noted above, it is noted that the two recorded luminance bands remain spatially correlated with each other, and therefor, in playback on standard VHS, any interference in the high-frequency detail portion of the picture is concealed and no additional noise in the flat parts of the picture is experienced. It is also noted that the new format can be realized without the need of complex and therefor relatively expensive digital circuitry, such as frame memories, nor is a time-base corrector needed.

DETAILED DESCRIPTION OF THE PREFERRED EMBODIMENTS

The present description is made in the context of a television signal processing system in accordance with the NTSC television standards used in the United States. Nevertheless, the principles of the invention apply equally well to the PAL system used primarily in Europe. Additionally, the invention applies equally well to recording formats other than VHS, the exemplary format used herein.

Figure 1A:
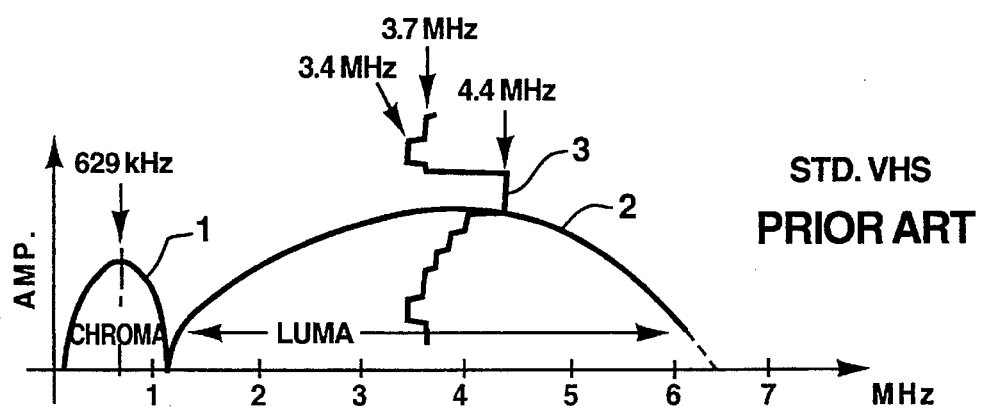
FIG. 1a is a graph of the average energy level in the spectrum of a prior art "color-under" color television video signal magnetic recording process on a magnetic tape recorded in an existing standard format, i.e., VHS.

FIG. 1a illustrates a typical RF energy spectrum for NTSC color television picture information recorded in the known VHS format using the well known color-under technique. At the low end of this spectrum, the chrominance (chroma) information is recorded in quadrature as amplitude modulation 1 carried by, e.g., a 629 kHz color carrier. AM color sidebands extend outwardly from the color carrier by approximately 500 kHz on both sides thereof.

Luminance information is recorded as frequency modulation 2 at a higher frequency. For example, sa illustrated with the staircase baseband video signal 3, the synchronization (sync) tips are at about 3.4 MHz, black level is at about 3.7 MHz and white level is at about 4.4 MHz. A lower luminance sideband extends downwardly in frequency to about 1.2 MHz and an upper luminance sideband extends upwardly to about 6.4 MHz. However, the upper frequency end tends to be reduced in amplitude during playback, since its spectrum is a function of the characteristics of the particular magnetic tape medium, the recording/playback head, and the electronic circuitry of the particular VCR machine.

Since the spectrum available for the lowest luminance sideband is not wider than about 2.5 MHz for black level information, the effective bandwidth during VCR playback is limited to about 200 to 250 lines, resulting in a noticeably degraded picture which is well below broadcast standards.

Figure 1B:
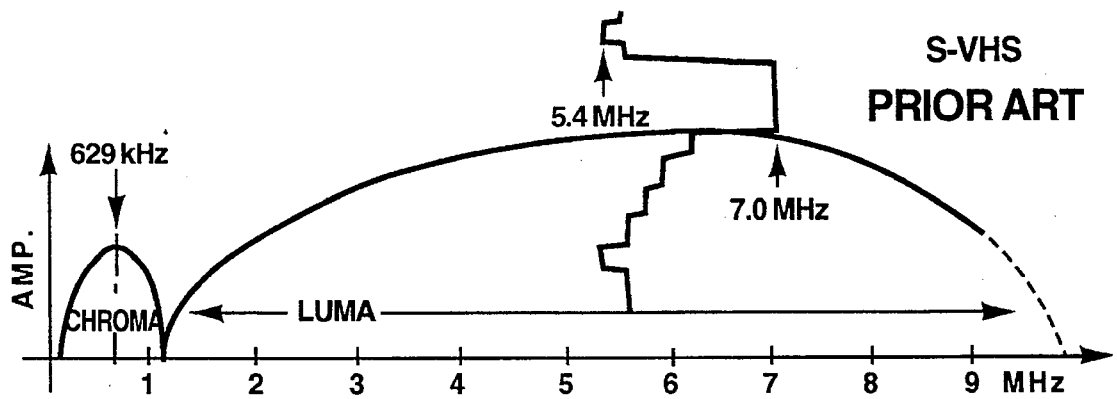
FIG. 1b is a spectral graph similar to that illustrated in FIG. 1a, but for a magnetic tape recorded in the Super-VHS format.

One prior approach to improve VCR picture quality is to simply raise the FM carrier frequency used by the recorder in order to take advantage of the latest advances in magnetic media and recording heads, such as in the S-VHS recording format shown in FIG. 1b. This energy spectrum is substantially the same as that illustrated in FIG. 1a, however, the luminance carrier modulation is from 5.4 MHz for sync tips to 7.0 MHz for white level. Again, the upper end tends to be limited to about 8.5 MHz due to recording tape and hardware limitations. As previously noted, video tapes recorded in this format are incompatible with the standard VHS format and can only be used in S-VHS VCR's, thereby preventing the widespread use and popularity of this improved performance format.

Figure 2:
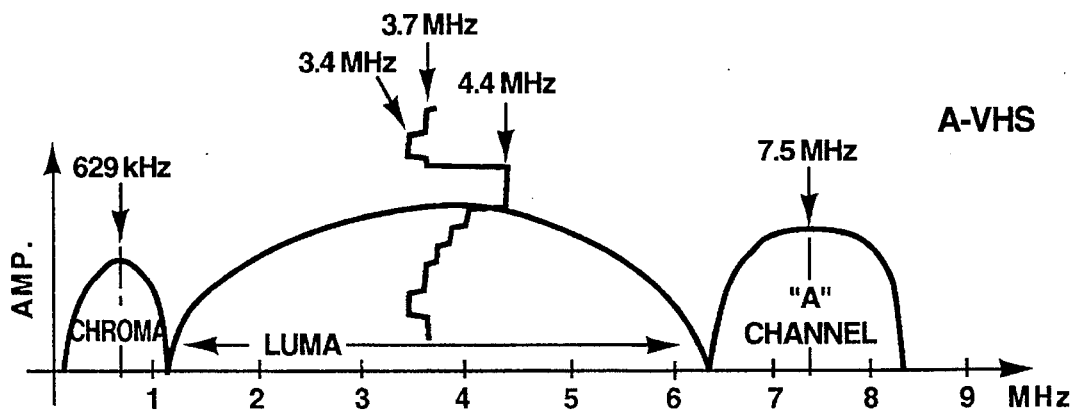
FIG. 2 is a spectral graph of a color-under color television video signal magnetic recording process on a magnetic tape recorded in the augmented VHS format of the present invention.

In accordance with the principles of the invention, a new recording format is provided having an augmentation channel for carrying high-frequency luminance signals in the tape bandwidth above the standard (low-frequency) luminance bandwidth, as shown in FIG. 2. The chrominance and low-frequency luminance information are AM and FM modulated, respectively, just as in the standard VHS format shown in FIG. 1a, however an augmentation carrier, at e.g., 7.5 MHz, is AM modulated with the high-frequency luminance portion of the NTSC video signal. In order to reduce interference between the standard and augmentation luminance channels, the standard FM luminance channel is bandwidth limited to just over 6 MHz. Since the chrominance and low-frequency luminance information are recorded in the same manner as the standard VHS format, the A-VHS format is completely backward compatible with standard VHS. Additionally, since the A-VHS format uses the same basic tape and heads as S-VHS, with only the addition of augmentation luminance carrier, an A-VHS recorder only requires an additional demodulator circuit and simple filtering to provide the improved picture performance over that of standard VHS, resulting in no increase in cost for an A-VHS recorder as compared to an S-VHS VCR. Furthermore, since A-VHS format recorders have high-frequency capability record/playback heads and use high-quality magnetic recording tape, they can simply include S-VHS circuitry for selectively playing back S-VHS tapes, if desired.

Figure 3:
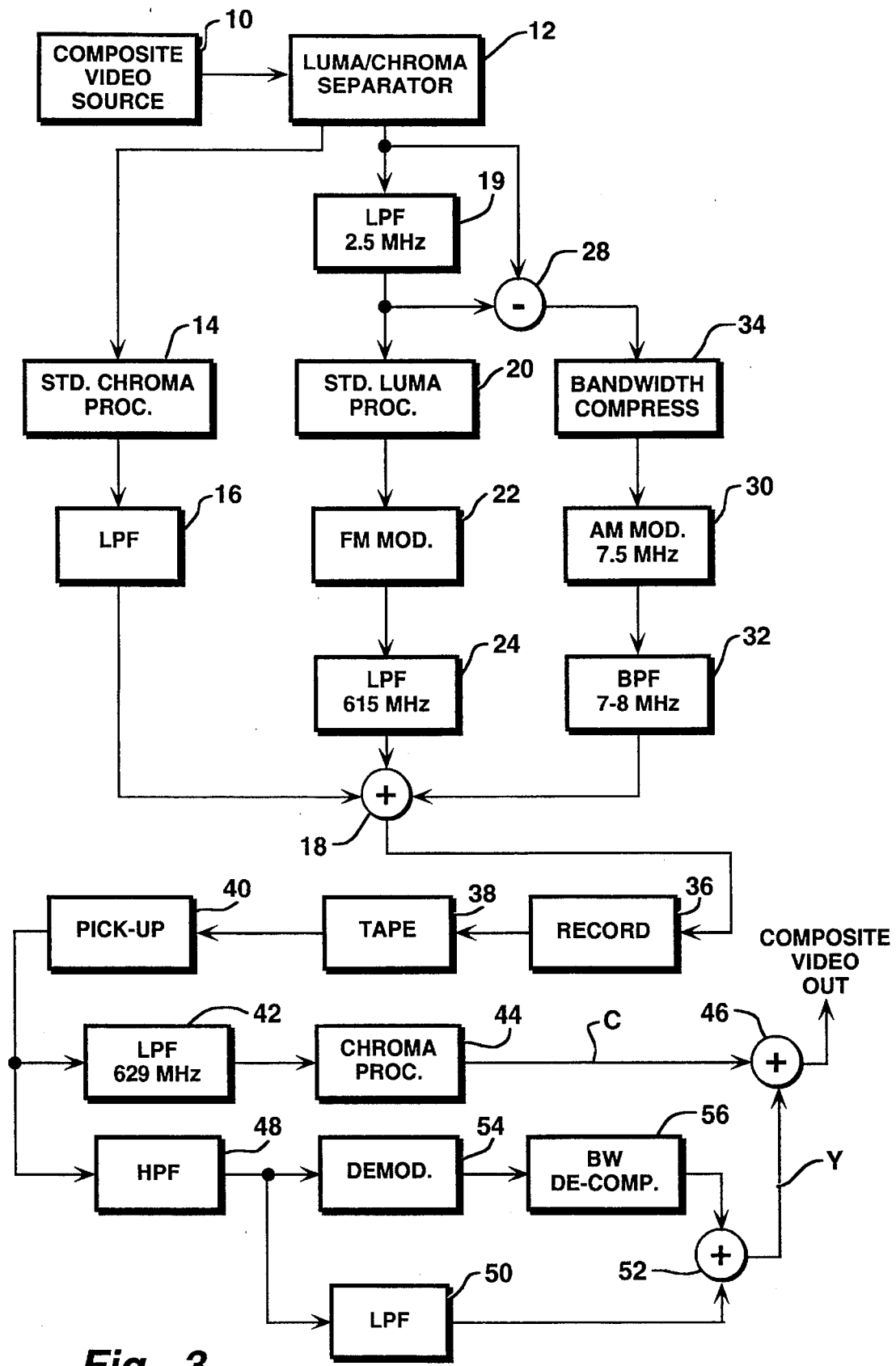
FIG. 3 illustrates in simplified block diagram form the record and playback portions of a video cassette recorder for recording and playing back color television video signals in accordance with the principles of the invention.

FIG. 3 illustrates in simplified block diagram form the record and playback portions of a video cassette recorder for recording and playing back color television video signals in accordance with the principles of the invention. For recording, a source 10 of composite video signal (such as an NTSC video signal) is divided into its luminance (L) and chrominance (C) components by a luma/chroma separator 12 of conventional design. The chrominance component is processed and low pass filtered by a conventional chroma processor 14 and low pass filter (LPF) 16 for providing a conventional "color under" chroma signal to one input of an adder 18. In a similar manner, a VHS type luminance component is developed by a 2.5 MHz LPF 19 which is then processed and FM modulated by a conventional luma processor 20 and FM modulator 22. To ensure that the upper sideband of the luminance FM modulation does not interfere with the augmentation channel, a LPF 24 having a cut-off frequency of 6.5 MHz couples the modulated luminance component to a second input of adder 18. The high-frequency luminance component for the augmentation channel is obtained by subtracting-out the low-frequency luminance components by coupling the input and output of 2.5 MHz LPF 19 to first and second inputs, respectively, of a subtractor 28. The output of subtractor 28 comprises the NTSC luminance components between 2.5 MHz and 4.2 MHz. In accordance with the principles of the invention, these high frequency luminance components are AM modulated on a carrier, such as a 7.5 MHz, signal, by a modulator 30 and applied, via a high pass filter (HPF) 32, to a third input of adder 18. In accordance with an aspect of the invention shown in the preferred embodiment, the amount of high-frequency luminance information included in the band-limited augmentation channel is maximized by using a bandwidth compression circuit 34 in the signal processing path before the AM modulator 30. It will be obvious to those skilled in the art of signal processing, that some of the input signals to adder 18 must be appropriately delayed to compensate for processing delays experienced in one other signal path. The output of adder 18 is applied to a tape record apparatus 36 (comprising record driver circuitry and record heads, not specifically shown) via which the signal spectrum shown in FIG. 2 is recorded on magnetic tape 38.

For playback, a tape pick-up apparatus 40 (comprising pick-up heads and preamplifier circuitry, not specifically shown) recovers the FIG. 2 spectrum from magnetic tape 38. Due to the nature of the color-under signal, the chroma component is recovered in the standard manner using an appropriate LPF 42 and chroma processor 44, and then applied to a first input of an adder 46. The standard and augmentation channel luminance components are recovered using an appropriate HPF 48. From the output of HPF 48, a LPF 50 separates out the standard VHS luma component and applies it to one input of an adder 52. An appropriate (7.5 MHz) AM demodulator 54 recovers the high-frequency luma components from the augmentation channel, which are then applied to a second input of adder 52 after an appropriate bandwidth decompression which is complementary to that provided by bandwidth compression circuit 34.

Figure 4:
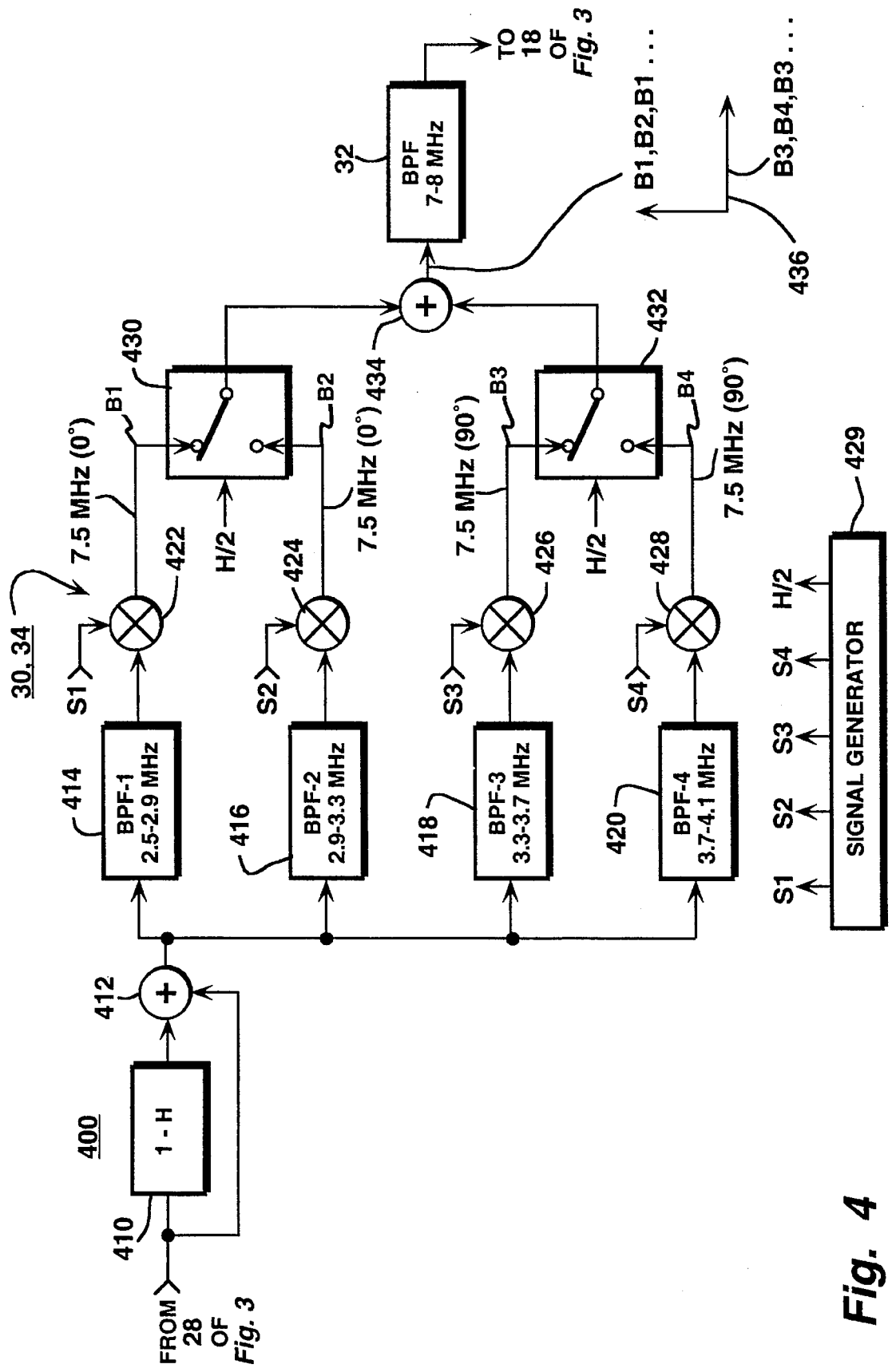
FIG. 4 illustrates details of a preferred embodiment of the record portion of the video cassette recorder shown in FIG. 3.

Referring to FIG. 4, details of the bandwidth compression and FM modulation circuits 34 and 30, respectively, of the augmentation channel are shown. The high-frequency luminance components from the output of subtractor 28 of FIG. 3 are applied to the input of a vertical low pass filter 400. Vertical LPF 400 comprises a 1-H delay line 410 and an adder 412 for averaging together time-sequential television line intervals of the video signal in a well known manner. The output of adder 412 is simultaneously coupled to the input of four parallel connected band pass filters (BPF's) 414, 416, 418 and 420 which provide at their outputs bandwidth spectrums, (in MHz), of B1 (2.5–2.9), B2 (2.9–3.3), B3 (3.3–3.7) and B4 (3.7–4.1), respectively. Each band signal B1–B4 is then frequency shifted and AM modulated to the 7.5 MHz augmentation carrier frequency by a respective one of mixers 422, 424, 426 and 248, respectively, by application to respective ones of mixers 422–428 of an appropriate one of modulation signals S1, S2, S3 and S4, respectively. The frequency and phase of each of signals S1–S4 is selected so that modulated and frequency shifted band signals B1 and B2 become 90 degrees out of phase with band signals B3 and B4 at the outputs of their respective mixers, as shown in FIG. 4.

A signal generator 429 generates signals S1–S4 using, e.g., conventional signal division techniques, so that signal S1–S4 comprise the frequencies (in MHz) of 5.0, 4.6, 4.2 and 3.8, respectively. A multiplexer 430 has band signals B1 and B2 coupled to its inputs, and a multiplexer 432 has band signals B3 and B4 coupled to its inputs. Multiplexer 430 and 432 are each driven by a one-half horizontal line-rate signal (H/2) for sequentially applying to an adder 434 quadrature modulated band signals B1, B3 during one horizontal line-time interval, and then B2, B4 during the next horizontal line-time interval. The quadrature-modulated line-sequential band signals are illustrated by vector diagram 436. BPF 32 cleans up the frequency spectrum provided at the output of adder 434 so as to select the double sideband, quadrature modulated, bandwidth compressed, augmentation channel signal, to comprise only the upper and lower first order sidebands of the 7.5 MHz modulated signal.

Figure 5:
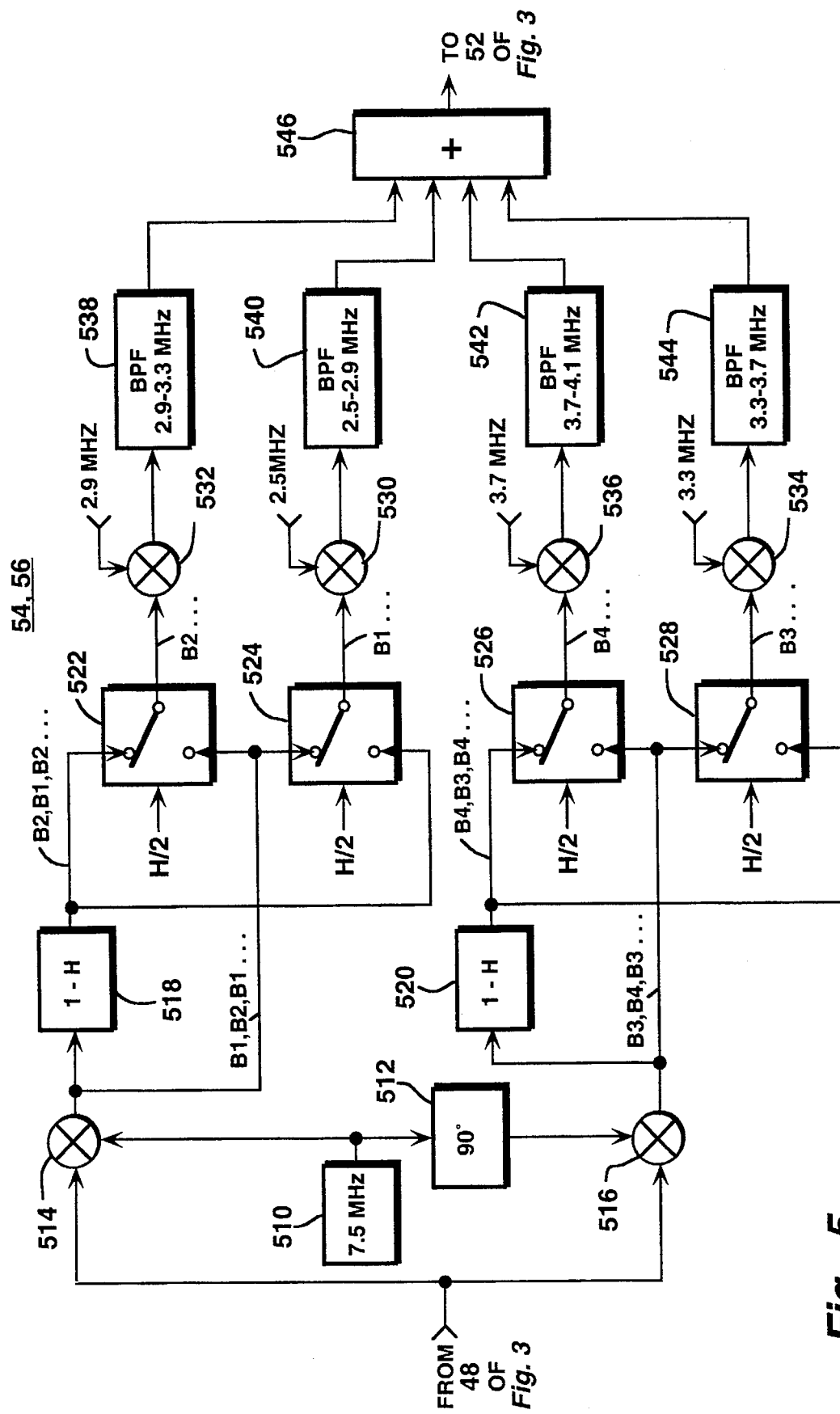
FIG. 5 illustrates details of the playback portion of the video cassette recorder shown in FIG. 3.

Referring to FIG. 5, details of the playback apparatus comprising demodulator 54 and decompressor 56 are shown, wherein the quadrature modulated augmentation channel signal from the output filter 48 is first demodulated from 7.5 MHz down to baseband using a 7.5 MHz signal source 510, a 90 degree phase shifter 512 and mixers 514 and 516. The line-sequential output of mixer 514 is band signals B1, B2, B1 . . . and the line-sequential output of mixer 516 is band signals B3, B4, B3 . . . The 1-H delay lines 518 and 520 are used to rearrange the line-sequential signals so that multiplexers 522, 524, 526 and 528 can each individually select only one of each of the band signals for later processing. That is, the band signal sequence at the output of mixer 514 is applied to the lower and upper inputs of multiplexers 522 and 524 and the band signal sequence at the output of 1-H delay line 518 is applied to the upper and lower inputs of multiplexers 522 and 524. Multiplexers 522 and 524 are each driven by a one-half horizontal line-time signal. Thus, the output of multiplexer 522 is always band signal B2 and the output of multiplexer 524 is always band signal B1. In a similar manner, the band signal sequence at the output of mixer 516 is applied to the lower and upper inputs of multiplexers 526 and 528 and the band signal sequence at the output of 1-H delay line 520 is applied to the upper and lower inputs of multiplexers 526 and 528. Multiplexers 526 and 528 are each driven by a one-half horizontal line time signal. Thus, the output of multiplexer 526 is always band signal B4 and the output of multiplexer 528 is always band signal B3. Band signals B1–B4 are then shifted back to their proper position in the high-frequency luminance spectrum of 2.5 MHz–4.1 MHz by ixers 530, 532, 534 and 536, respectively having mixing signals (in MHz) of 2.5, 2.9, 3.3 and 3.7 applied thereto, respectively. BPF's 538, 540, 542 and 544 select the appropriate bandwidth, i.e., (in MHz) 2.5–2.9, 2.9–3.3, 3.3–3.7 and 3.7–4.1 from the outputs of mixers 530–536, respectively. An adder 546 combines the outputs of BPF's 538–544 for recreating the original high-frequency luminance spectrum of 2.5 MHz–4.1 MHz. Again it should be mentioned that all signals must be appropriately delayed to compensate for processing delays for the individual band signals.

Thus there has been shown and described a novel video tape recording format which provides improved picture performance over and backwards compatibility with existing standard formats and provides all the advantages sought therefor. Many changes, modifications, variations and other uses and applications of the subject invention will, however, become apparent to those skilled in the art after considering the above specification and accompanying drawings which disclose a preferred embodiment thereof. For example, as previously noted, it is not strictly necessary for the invention to provide a bandwidth compression for the augmentation channel, its just that it is desirable in that it allows more high-frequency luminance information to be transmitted. Furthermore, when bandwidth compression is used, the particular type used could be much different than that shown herein. For example, another method would be to compress about 2 MHz of the high-frequency part of the luminance signal into a smaller band of horizontal frequency, such as 500 kHz, by vertically and temporally low pass filtering of the signal, and then recording 500 kHz parts of the high frequency spectrum sequentially on alternating lines and in alternating fields. Furthermore, HDTV type compression could be used, such as Discreet Cosine Transforms (DCT), with the possibility that HDTV might be recorded and reproduced with this new recording format. Additionally, sub-coding or transform coding method of bandwidth compression can be used. Finally, it should be noted that the frequencies used herein are exemplary only and in each specific application of the invention other frequencies may be more appropriate. All such changes, modifications, variations and other uses and applications which do not depart from the spirit and scope of the invention are deemed to be covered by the invention which is limited only the claims which follow.

What I claim is:

1. A recording on magnetic tape made in a manner compatible with another recording format, said recording including the recording of a frequency-multiplexed signal on a helical-scanning track, wherein said frequency-multiplexed signal encodes a chrominance said component recorded in accordance with said other recording format, wherein said frequency-multiplexed signal encodes a luminance signal component that has a given bandwidth, but wherein only a low-frequency portion of said given bandwidth is recorded in accordance with said other recording format, said frequency-multiplexed signal comprising:

a first frequency band containing a first carrier wave modulated in accordance with the chrominance signal component;

a second frequency band adjacent to and above the frequency range of said first frequency band, said second frequency band containing a second carrier wave modulated in accordance with a low-frequency portion of the luminance component of the video signal; and a third frequency band adjacent to and above the frequency range of said second frequency band, said third frequency band containing a third carrier wave modulated in accordance with the high-frequency portion of the luminance of the video signal, which high-frequency portion comprises the remainder of the luminance information available from the given bandwidth, wherein a bandwidth compression technique is used to compress the bandwidth of the signal in accordance with which the third carrier in said third frequency band is modulated.

2. The video signal recording of claim 1 wherein:

said compression technique utilizes quadrature modulation.

3. The video signal recording of claim 1, wherein:

said low-frequency portion of the luminance signal component, in accordance with which the second carrier in said second frequency band is modulated, has a bandwidth of 2.5 MHz more or less.

4. A method for recording luminance and chrominance components of a video signal on a magnetic tape in a manner compatible with another recording format in which said other recording format only a low-frequency portion of the luminance component of said video signal is recorded, said method comprising the following steps:

separating the luminance and chrominance components from the video signal;

filtering said luminance component so as to provide a low-frequency luminance component having a bandwidth corresponding to that recorded in said other recording format, and a high-frequency luminance component having a bandwidth corresponding to the remainder of the luminance information available in said video signal;

processing and recording onto first and second frequency bands of said magnetic tape said chrominance and low-frequency luminance components, respectively, in the same manner as in said other recording format;

applying a bandwidth compression technique to said high-frequency luminance component to generate a compressed-bandwidth signal; and recording said compressed-bandwidth signal onto said magnetic tape in a third frequency band having a carrier frequency greater than that used in said second frequency band.

5. The method of claim 4, wherein:

said compression technique includes separation of said high-frequency luminance component into a plurality of smaller frequency bands.

6. The method of claim 5, wherein:

said compression technique includes quadrature modulation of pairs of said plurality of smaller frequency bands.

7. The method of claim 6, wherein:

different pairs of said quadrature modulated signals are recorded on said magnetic tape in a time sequential manner.

8. A magnetic tape recorded by the method of claim 4.
9. A magnetic tape recorded by the method of claim 5.
10. A magnetic tape recorded by the method of claim 6.
11. A magnetic tape recorded by the method of claim 7.

12. Apparatus for recording luminance and chrominance components of a video signal on a magnetic tape in a manner compatible with another recording format in which only a low-frequency portion of the luminance component of said video signal is recorded, comprising:

means for separating the luminance and chrominance components from the video signal;

means for filtering said luminance component so as to provide a low-frequency luminance component having a bandwidth corresponding to that recorded in said other recording format, and a high-frequency luminance component having a bandwidth corresponding to the remainder of the luminance information available in said video signal;

means for processing and recording onto first and second frequency bands of said magnetic tape said chrominance and low-frequency luminance components, respectively, in the same manner as in said other recording format;

means for processing said high-frequency luminance component, which means for processing includes a bandwidth compression circuit for bandwidth compressing said high-frequency luminance component thereby to generate a compressed-bandwidth signal; and means for recording said compressed-bandwidth signal onto said magnetic tape in a third frequency band having a carrier frequency greater than that used in said second frequency band.

13. The apparatus of claim 12, wherein:

said compression circuit includes means for separation of said high-frequency luminance component into a plurality of smaller frequency bands.

14. The apparatus of claim 13, wherein:

said compression circuit includes means for quadrature modulation of pairs of said plurality of smaller frequency bands.

15. The apparatus of claim 14, wherein:

said means for quadrature modulation records different pairs of said quadrature modulated signals on said magnetic tape in a time-sequential manner.

16. Apparatus for playing back magnetic tape having a wideband video signal recording thereon, the magnetic tape having a chrominance signal component recorded in a first frequency band thereof, the luminance signal having a low-frequency portion recorded in a second frequency band thereof, and the luminance signal component having a high-frequency portion recorded in a third frequency band thereof, said first frequency bands being recorded on the magnetic tape with a first carrier frequency, said second frequency band being recorded on the magnetic tape with a second carrier frequency higher than said first carrier frequency, and said third frequency band being recorded on the magnetic tape with a third carrier frequency higher than said second carrier frequency, said apparatus, comprising:

means for recovering said chrominance signal component from said first frequency band recorded on the magnetic tape;

means for recovering said low-frequency portion of the luminance signal component from said second frequency band recorded on the magnetic tape;

means for recovering said high frequency portion of the luminance signal component from said third frequency band recorded on the magnetic tape, which means for recovering includes means for decompressing the high-frequency portion of the luminance signal component recorded on the magnetic tape; and means for combining said recovered chrominance and low and high-frequency portions of the luminance signal component together for generating said wideband composite video signal.

17. A recording on magnetic tape made in a manner compatible with another recording format, said recording including the recording of a frequency-multiplexed signal on a helical-scanning track, wherein said frequency-multiplexed signal encodes a chrominance signal component recorded in accordance with said other recording format, wherein said frequency-multiplexed signal encodes a luminance signal component that has a given bandwidth, but wherein only a low-frequency portion of said given bandwidth is encoded in accordance with said other recording format, said frequency-multiplexed signal comprising:

a first frequency band containing a first carrier wave amplitude-modulated in accordance with the chrominance signal component:

a second frequency band circuit adjacent to and above the frequency range of said first frequency band, said second frequency band containing a second carrier wave frequency-modulated in accordance with the low-frequency portion of the luminance component of the video signal; and a third frequency band adjacent to and above the frequency range of said second frequency band, said third frequency band containing a third carrier wave modulated in accordance with the high-frequency portion of the luminance component of the video signal, which high-frequency portion comprises the remainder of the luminance information available form the given bandwidth, wherein said third carrier wave is amplitude-modulated in a first phasing by the lower-frequency subportion of the high-frequency portion of the luminance component of the video signal, said third carrier wave is amplitude-modulated in a second phasing by the upper-frequency subportion of the high-frequency portion of the luminance component of the video signal, and said first and second phasings are in quadrature relationship with each other.

\* \* \* \* \*